United States Patent [19]
Nakajima et al.

[11] Patent Number: 5,272,626
[45] Date of Patent: Dec. 21, 1993

[54] FREQUENCY PROCESSING METHOD FOR RADIATION IMAGES

[75] Inventors: Nobuyoshi Nakajima; Tsutomu Kimura, both of Kanagawa, Japan

[73] Assignee: Fuji Photo Film Co., Ltd., Kanagawa, Japan

[21] Appl. No.: 866,478

[22] Filed: Apr. 10, 1992

[30] Foreign Application Priority Data

Apr. 17, 1991 [JP] Japan .................. 3-085583

[51] Int. Cl.$^5$ .................. G06F 15/42; G06F 15/62
[52] U.S. Cl. .................. 364/413.13; 364/413.14; 364/413.17; 364/413.19
[58] Field of Search .................. 364/413.13, 413.14, 364/413.17, 413.19; 382/54

[56] References Cited

U.S. PATENT DOCUMENTS

| | | | |
|---|---|---|---|
| 4,315,318 | 2/1982 | Kato et al. | 364/515 |
| 4,317,179 | 2/1982 | Kato et al. | 364/515 |
| 4,747,052 | 5/1988 | Hishinuma et al. | 364/414 |
| 5,051,902 | 9/1991 | Hishinuma | 364/413.13 |

Primary Examiner—Robert A. Weinhardt
Assistant Examiner—Ari M. Bai
Attorney, Agent, or Firm—Sughrue, Mion, Zinn, Macpeak & Seas

[57] ABSTRACT

A radiation image of an object is formed with radiation, which has passed through the object. The radiation image is then photoelectrically read out, and an image signal made up of a series of image signal components representing the radiation image is thereby obtained. Frequency processing is carried out on the image signal in accordance with a predetermined emphasis coefficient $\beta$. When the frequency processing is carried out on image signal components corresponding to a peripheral region in the radiation image, which peripheral region has a predetermined width, the value of the emphasis coefficient $\beta$ used during the frequency processing is decreased monotonously from a value for an image signal component corresponding to a position on the radiation image, which position is closer to the middle part of the radiation image, to a value for an image signal component corresponding to a position on the radiation image, which position is closer to the exterior of the radiation image. The frequency processing is thus carried out such that an artifact occurring at peripheral regions in a reproduced visible image may become imperceptible.

2 Claims, 2 Drawing Sheets

FREQUENCY PROCESSING METHOD FOR RADIATION IMAGES

BACKGROUND OF THE INVENTION

1. Field of the Invention

This invention relates to a frequency processing method for a radiation image to be used in making a medical diagnosis, or the like. This invention particularly relates to a frequency processing method for a radiation image, which is carried out in order that a visible radiation image having good image quality can be reproduced and used as an effective tool in, particularly, the accurate and efficient diagnosis of an illness, and with which an artifact occurring at peripheral regions in a reproduced visible image can be reduced.

2. Description of the Prior Art

Frequency processing is carried out in order that a visible radiation image having good image quality can be reproduced and used as an effective tool in, particularly, the accurate and efficient diagnosis of an illness. One example of the frequency processing is frequency emphasis processing, such as unsharp mask processing disclosed in, for example, U.S. Pat. Nos. 4,315,318 and 4,317,179. With the frequency emphasis processing, an unsharp mask signal Dus is subtracted from a read-out image signal Dorg, which has been detected from a radiation image. The obtained difference value is multiplied by an emphasis coefficient $\beta$. The resulting product is added to the read-out image signal Dorg. In this manner, predetermined spatial frequency components in the image can be emphasized. The frequency emphasis processing is represented by the formula $$D = Dorg + \beta(Dorg - Dus)$$

wherein D represents the signal obtained from the frequency processing, Dorg represents the read-out image signal, Dus represents the unsharp mask signal, and $\beta$ represents the emphasis coefficient.

As described above, the frequency processing is carried out in order that a visible radiation image having good image quality can be reproduced and used as an effective tool in, particularly, the accurate and efficient diagnosis of an illness. However, the conventional frequency processing has the drawbacks described below. Specifically, FIG. 1 shows an example of the distribution of an original image signal. However, a radiation image signal having been obtained by two-dimensionally scanning a recording medium, on which a radiation image has been recorded, with reading light has the drawbacks in that, as illustrated in FIG. 2 and FIG. 3, a perceptible artifact 3 occurs at peripheral regions in a radiation image 2 recorded on a recording medium 1, which peripheral regions are located in the vicinity of the ends of the radiation image 2. The artifact 3 adversely affects the medical diagnosis, or the like.

The value of the emphasis coefficient $\beta$ used during the frequency processing is automatically set in accordance with which portion of an object is represented by the recorded image, which mode was used when the image was recorded (e.g., a contrasted image recording mode or a tomographic image recording mode), or the like. Alternatively, the value of the emphasis coefficient $\beta$ is manually set from an external input device. However, in cases where the emphasis coefficient $\beta$ is merely set automatically or manually, the artifact described above cannot be eliminated. Therefore, a need exists for an improved frequency processing method for a radiation image.

SUMMARY OF THE INVENTION

The primary object of the present invention is to provide a frequency processing method for a radiation image, wherein frequency processing is carried out such that an artifact occurring at peripheral regions in a reproduced visible image may become imperceptible.

Another object of the present invention is to provide a frequency processing method for a radiation image, with which a visible radiation image, having good image quality, can be reproduced such that the visible image is effective as a tool in, particularly, the accurate and efficient diagnosis of an illness.

The present invention provides a frequency processing method for a radiation image, which comprises the steps of:

i) forming a radiation image of an object with radiation, ii) photoelectrically reading out the radiation image, an image signal made up of a series of image signal components representing the radiation image being thereby obtained, and iii) carrying out frequency processing on the image signal in accordance with a predetermined emphasis coefficient $\beta$, wherein frequency processing out on image signal components corresponding to a peripheral region in said radiation image, which peripheral region has a predetermined width, is carried out such that the value of said emphasis coefficient $\beta$ used during said frequency processing is decreased monotonously from a value for an image signal component corresponding to a position on said radiation image, which position is closer to the middle part of said radiation image, to a value for an image signal component corresponding to a position on said radiation image, which position is closer to the exterior of said radiation image.

The frequency processing method for a radiation image in accordance with the present invention is particularly suitable for a radiation image recording and read-out method utilizing a stimulable phosphor sheet, wherein the formation of said radiation image is carried out by exposing a stimulable phosphor sheet to the radiation, the radiation image being thereby stored on said stimulable phosphor sheet, and said photoelectric readout is carried out by exposing said stimulable phosphor sheet to stimulating rays, which cause it to emit light in proportion to the amount of energy stored thereon during its exposure to the radiation, and photoelectrically detecting the emitted light.

With the frequency processing method for a radiation image in accordance with the present invention, when the frequency processing is carried out on image signal components corresponding to a peripheral region in the radiation image, which peripheral region has a predetermined width (i.e., in which an artifact will occur easily), the value of the emphasis coefficient $\beta$ used during the frequency processing is decreased monotonously from a value for an image signal component corresponding to a position on the radiation image, which position is closer to the middle part of the radiation image, to a value for an image signal component corresponding to a position on the radiation image, which position is closer to the exterior of the radiation image. Therefore, with the frequency processing method for a radiation image in accordance with the present invention, the artifact can be prevented from occurring in a reproduced visible image.

DESCRIPTION OF THE PREFERRED EMBODIMENTS

The present invention will hereinbelow be described in further detail with reference to the accompanying drawings.

Figure 4:
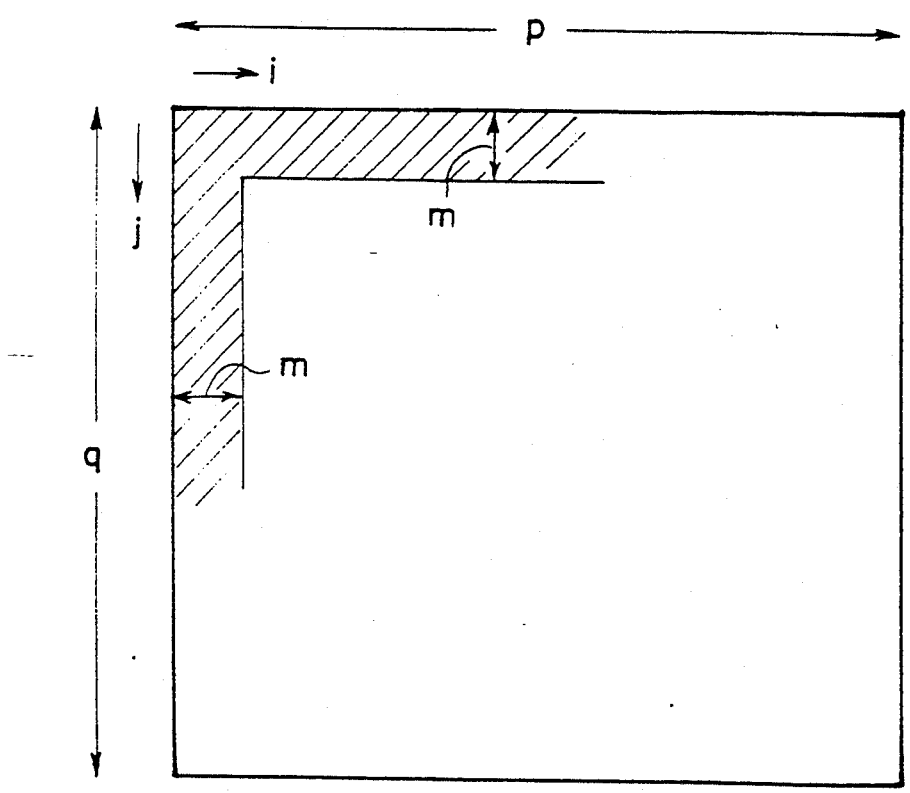
FIG. 4 is an explanatory view showing an embodiment of the frequency processing method for a radiation image in accordance with the present invention, in which view the size of an image is indicated by the number of picture elements.

FIG. 4 is an explanatory view showing an embodiment of the frequency processing method for a radiation image in accordance with the present invention, in which view the size of an image is indicated by the number of picture elements.

Frequency processing is carried out in order that a visible radiation image, having good image quality, can be reproduced and used as an effective tool in, particularly, the accurate and efficient diagnosis of an illness. By way of example, with frequency emphasis processing, such as unsharp mask processing, which is disclosed in U.S. Pat. No. 4,315,318, predetermined spatial frequency components in an image are emphasized by the formula $$D = Dorg + \beta(Dorg)(Dorg - Dus)$$

wherein Dus represents the mean value of the values of the image signal components of a read-out image signal Dorg representing picture elements, which fall within a square area having a size corresponding to N×N picture elements in the image. The mean value is expressed as $\Sigma Dorg/N^2$. Also, the value of the emphasis coefficient $\beta$ is determined by the value of the read-out image signal Dorg.

In the embodiment of the frequency processing method for a radiation image in accordance with the present invention, frequency processing is carried out with the formula $$D = Dorg + \alpha \times \beta(Dorg)(Dorg - Dus)$$

Figure 1:
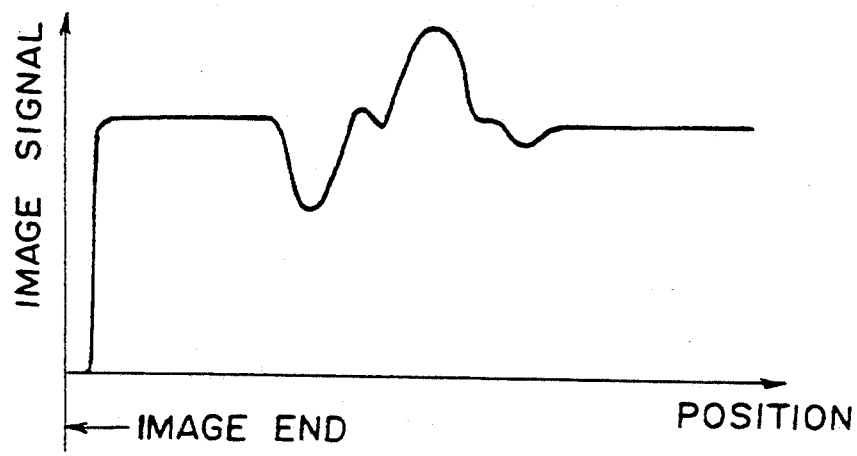
FIG. 1 is a graph showing an example of a distribution of an original image signal.
Figure 2:
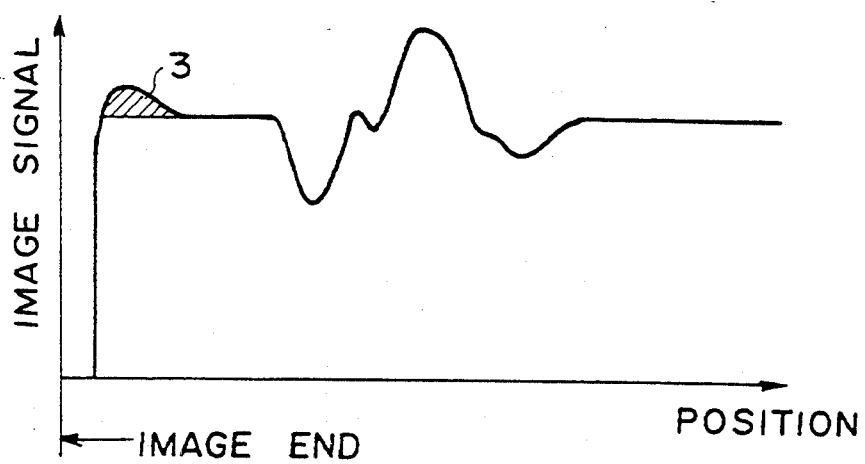
FIG. 2 is a graph showing an example of a distribution of an image signal having artifact components.
Figure 3:
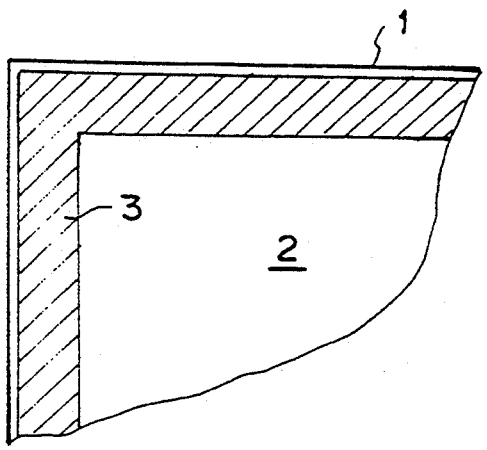
FIG. 3 is a plan view showing part of an image having an artifact.

Specifically, the emphasis coefficient $\beta$ is multiplied by a factor $\alpha$. Therefore, the value of the emphasis coefficient $\beta$ changes in accordance with the value of the factor $\alpha$. The value of the emphasis coefficient $\beta$ is changed by the factor $\alpha$ such that, when the frequency processing is carried out on image signal components corresponding to a peripheral region in the radiation image 2 illustrated in FIG. 3, which peripheral region has a predetermined width (and in which an artifact will occur easily), the value of the emphasis coefficient $\beta$ used during the frequency processing is decreased monotonously from a value for an image signal component corresponding to a position on the radiation image 2, which position is closer to the middle part of the radiation image 2, to a value for an image signal component corresponding to a position on the radiation image 2, which position is closer to the exterior of the radiation image 2.

Specifically, as illustrated in FIG. 4, the size (p×q) of the radiation image and the width (m) of the peripheral region in the radiation image are set. When the frequency processing is carried out on the image signal components corresponding to the peripheral region having the width m, the value of the factor $\alpha$ is decreased monotonously from a value for an image signal component corresponding to a position on the radiation image 2, which position is closer to the middle part of the radiation image 2, to a value for an image signal component corresponding to a position on the radiation image 2, which position is closer to the exterior of the radiation image 2. In this manner, the value of the factor $\alpha$ is decreased monotonously in accordance with the position (i) of a picture element with respect to the horizontal direction in FIG. 4 and the position (j) of a picture element with respect to the vertical direction in FIG. 4. As one example of the change of the value of the factor $\alpha$, the combination of at least one of Formulas (1), (2), (3), and (4), with Formula (5) is considered.

$$\alpha = i/m \quad (i < m) \tag{1}$$

$$\alpha = (p-i)/m \quad (i > p-m) \tag{2}$$

$$\alpha = j/m \quad (j < m) \tag{3}$$

$$\alpha = (q-j)/m \quad (j > q-m) \tag{4}$$

$$\alpha = 1 \quad \text{(otherwise)} \tag{5}$$

More specifically, when the frequency processing is carried out on the image signal components corresponding to the peripheral region having the width m, in which peripheral region the artifact will occur easily, the value of the factor $\alpha$ is increased monotonously from a value of 1/m to a value of m/m=1 in accordance with the value of i or j, i.e., in accordance with the distance of a picture element from an end of the radiation image 2. Stated differently, the value of the factor $\alpha$ is decreased monotonously from a value for an image signal component corresponding to a position on the radiation image 2, which position is closer to the middle part of the radiation image 2, to a value for an image signal component corresponding to a position on the radiation image 2, which position is closer to the exterior of the radiation image 2. By carrying out the frequency processing in this manner, an artifact can be prevented from occurring in a reproduced visible image.

Alternatively, Formulas (1), (2), (3), and (4) may be modified into Formulas (1'), (2'), (3'), and (4').

$$\alpha = (i/m)^2 \quad (i < m) \tag{1'}$$

$$\alpha = \{(p-i)/m\}^2 \quad (i > p-m) \tag{2'}$$

$$\alpha = (j/m)^2 \quad (j < m) \tag{3'}$$

$$\alpha = \{(q-j)/m\}^2 \quad (j > q-m) \tag{4'}$$

Also, in the embodiments described above, both the widths of the peripheral regions, which widths are taken in the horizontal direction and in the vertical direction in FIG. 4, are set as being equal to m. Alternatively, the widths of the peripheral regions may vary for different scanning directions.

Additionally, the factor $\alpha$ in the aforesaid embodiments may be replaced by the product of $\alpha_p$ and $\alpha_q$, which are expressed as $$\alpha_p = i/m \quad (i<m) \tag{1''}$$

$$\alpha_p = (p-i)/m \quad (i>p-m) \tag{2''}$$

$$\alpha_p = 1 \quad (otherwise) \tag{5'}$$

$$\alpha_q = j/m \quad (j<m) \tag{3''}$$

$$\alpha_q = (q-j)/m \quad (j>q-m) \tag{4''}$$

$$\alpha_q = 1 \quad (otherwise) \tag{5''}$$

In the embodiments described above, the value of the emphasis coefficient $\beta$ is changed in accordance with the original image signal Dorg. Therefore, the same effects as those obtained when $\beta$ is variable, as in the technique disclosed in U.S. Pat. No. 4,315,318 can be obtained. However, such a change of the value of the emphasis coefficient $\beta$ need not necessarily be effected. In cases where the value of the emphasis coefficient $\beta$ is changed in accordance with the original image signal Dorg, such a change may be effected such that the value of the emphasis coefficient $\beta$ may increase monotonously in accordance with the level of the original image signal. As another alternative, the value of the emphasis coefficient $\beta$ may be changed such that the value of the emphasis coefficient $\beta$ may increase monotonously when the level of the original image signal is low and high, and the value of the emphasis coefficient $\beta$ may be fixed when the level of the original image signal is medium.

Also, frequency emphasis with unsharp mask processing may be carried out ordinarily for image signal components corresponding to a region of a radiation image, at which the difference between the values of neighboring image signal components is small. Further, such that an artifact may be prevented from occurring, an increase in the degree of frequency emphasis may be restricted for image signal components corresponding to a region of the radiation image, at which the difference between the values of neighboring image signal components is large (e.g., a boundary between a bone pattern and a muscle pattern, a boundary between a soft tissue pattern and a pattern of a gaseous part, a boundary between a pattern of the stomach, into which barium has been injected, and the surrounding areas, or a boundary between a blood vessel pattern and the surrounding areas in an angiographic image recording mode).

In cases where the amount of radiation, to which the recording medium was exposed, is large and little noise is contained in the image recorded on the recording medium, or in cases where a plurality of images are superposed one upon another such that noise may be reduced, the emphasis coefficient used in the frequency processing may be set to a large value in order that a visible radiation image, having good image quality, can be reproduced and used as an effective tool in, particularly, the accurate and efficient diagnosis of an illness.

What is claimed is:

1. A frequency processing method for a radiation image, which comprises the steps of:
    i) forming a radiation image of an object with radiation,
    ii) photoelectrically reading out the radiation image, an image signal made up of a series of image signal components representing the radiation image being thereby obtained, and
    iii) carrying out frequency processing on the image signal in accordance with a emphasis coefficient $\beta$, wherein frequency processing on those image signal components corresponding to a peripheral region in said radiation image, which peripheral region has a predetermined width, is carried out such that the value of said emphasis coefficient $\beta$ used during said frequency processing is decreased monotonously from a value for an image signal component corresponding to a position on said radiation image, which position is closer to the middle part of said radiation image, to a value for an image signal component corresponding to a position on said radiation image, which position is closer to the exterior of said radiation image.

2. A method as defined in claim 1 wherein the formation of said radiation image is carried out by exposing a stimulable phosphor sheet to the radiation, the radiation image being thereby stored on said stimulable phosphor sheet, and said photoelectric readout is carried out by exposing said stimulable phosphor sheet to stimulating rays, which cause it to emit light in proportion to the amount of energy stored thereon during its exposure to the radiation, and photoelectrically detecting the emitted light.

* * * * *